United States Patent
Jin (10) Patent No.: US 11,582,133 B2
(45) Date of Patent: Feb. 14, 2023

(54) APPARATUS AND METHOD FOR DISTRIBUTED PROCESSING OF IDENTICAL PACKET IN HIGH-SPEED NETWORK SECURITY EQUIPMENT

(71) Applicant: WINS Co., Ltd., Gyeonggi-do (KR)

(72) Inventor: Yong Sig Jin, Gyeonggi-do (KR)

(73) Assignee: WINS Co., Ltd., Gyeonggi-do (KR)

( * ) Notice: Subject to any disclaimer, the term of this patent is extended or adjusted under 35 U.S.C. 154(b) by 207 days.

(21) Appl. No.: 17/128,826

(22) Filed: Dec. 21, 2020

(65) Prior Publication Data
US 2022/0150152 A1    May 12, 2022

(30) Foreign Application Priority Data
Nov. 6, 2020   (KR) .................. 10-2020-0147563

(51) Int. Cl.
*H04L 43/50*   (2022.01)
*H04L 47/21*   (2022.01)
(Continued)

(52) U.S. Cl.
CPC .............. *H04L 43/50* (2013.01); *H04L 43/12* (2013.01); *H04L 47/21* (2013.01); *H04L 63/1433* (2013.01)

(58) Field of Classification Search
CPC ......... H04L 43/50; H04L 43/12; H04L 47/21; H04L 63/1433; H04L 63/0227; H04L 49/901; H04L 47/50; H04L 49/9068
See application file for complete search history.

(56) References Cited

U.S. PATENT DOCUMENTS

| | | | |
|---|---|---|---|
| 2007/0180490 A1* | 8/2007 | Renzi | G06F 21/604 726/1 |
| 2017/0034023 A1* | 2/2017 | Nickolov | H04L 43/0817 |
| 2020/0252418 A1* | 8/2020 | Atighetchi | H04L 63/20 |

FOREIGN PATENT DOCUMENTS

| | | | | |
|---|---|---|---|---|
| KR | 20080037909 A | * | 5/2008 | .......... H04L 63/145 |
| KR | 1020080037909 A | | 5/2008 | |

(Continued)

OTHER PUBLICATIONS

Korean Patent Abstract (in English) of Korean Patent App. Pub. No. KR 10-1270743-B1, Pub. Date Jun. 3, 2013, from https://worldwide.espacenet.com.

(Continued)

*Primary Examiner* — Benjamin M Thieu
(74) *Attorney, Agent, or Firm* — Barcelo, Harrison & Walker, LLP (57) ABSTRACT

Disclosed is an apparatus for distributed processing of an identical packet in high-speed network security equipment, including: a plurality of analysis modules for each determining whether vulnerability analysis is required by analyzing a received packet; a circular queue for receiving the packet from an analysis module initially determining that the vulnerability analysis is required and storing the received packet as a bucket structure; and a plurality of analysis engines for each performing different vulnerability analyses for the packet acquired from the circular queue based on a packet address of the bucket structure, in which the bucket structure includes a packet data storage unit and packet use information storage units which are as many as the plurality of analysis engines, and the packet use information storage units store packet use information of the plurality of respective analysis engines, respectively.

8 Claims, 4 Drawing Sheets

(51) Int. Cl.
     *H04L 9/40*           (2022.01)
     *H04L 43/12*         (2022.01)

(56) References Cited

FOREIGN PATENT DOCUMENTS

| KR | 20090025901 A | * | 3/2009 |
|---|---|---|---|
| KR | 1020090025901 A | | 3/2009 |
| KR | 101270743 B1 | | 6/2013 |

OTHER PUBLICATIONS

Korean Patent Abstract (in English) of Korean Patent App. Pub. No. KR10-2008-0037909 A, Pub. Date May 2, 2008, downloaded from https://worldwide.espacenet.com.

Korean Patent Abstract (in English) of Korean Patent App. Pub. No. KR10-2009-0025901 A, Pub. Date Mar. 11, 2009, downloaded from https://worldwide.espacenet.com.

Office Action (in Korean) for KR Patent Application No. KR10-2020-0147563, dated Oct. 12, 2021.

\* cited by examiner

APPARATUS AND METHOD FOR DISTRIBUTED PROCESSING OF IDENTICAL PACKET IN HIGH-SPEED NETWORK SECURITY EQUIPMENT

CROSS-REFERENCE TO RELATED APPLICATIONS

This application claims priority from Korean Patent Application No. 10-2020-0147563, filed 6 Nov. 2020, in the Korean Intellectual Property Office. The entire contents of said applications are incorporated herein by reference for all purposes.

BACKGROUND OF THE DISCLOSURE

Technical Field

The present invention relates to an apparatus and a method for distributed processing of an identical packet in high-speed network security equipment.

Background Art

There are multiple analysis engines for performing vulnerability analysis in high-speed network equipment. In general, when packets are processed by multiple analysis engines, packet copying occurs to ensure data integrity. At this time, a lock processing task is performed to ensure a lot of copy time and data stability. Accordingly, in multiple analysis engines, an analysis processing speed is delayed due to a packet copy delay due to lock and lock contention.

In order to process the analysis at a high speed, some hardware implementations are used, but a phenomenon in which packets are copied unavoidably occurs.

Figure 1:
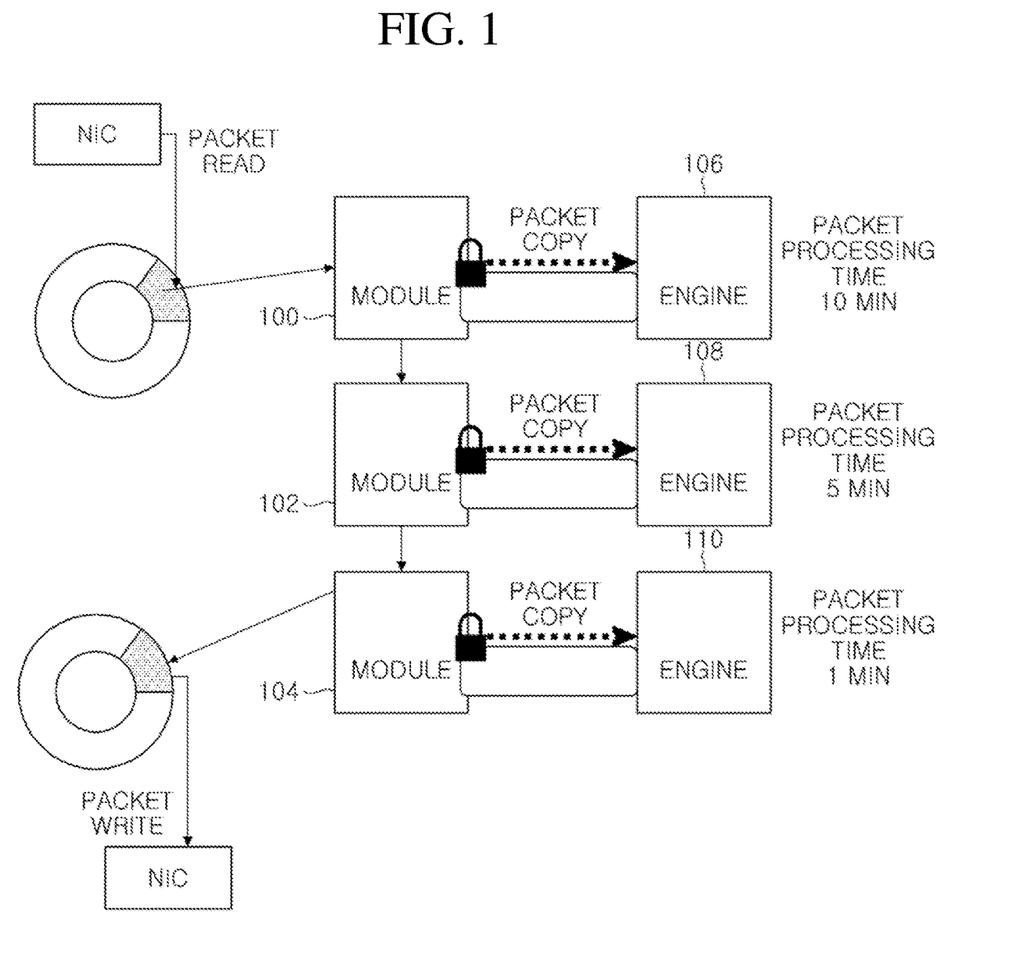
FIG. 1 is a diagram for describing a packet processing method of the related art for processing packets without interference in multiple analysis engines.

As illustrated in FIG. 1, packet processing performance of each of analysis engines 106, 108, and 110 may be different. For example, a packet processing time of a first analysis engine 106 may be 10 minutes, the packet processing time of a second analysis engine 108 may be 5 minutes, and the packet processing time of a third analysis engine 110 may be 1 minute.

As illustrated in FIG. 1, in order to process packets without interference in multiple analysis engines 106, 108, and 110, analysis modules 100, 102, and 104 copy packets to the analysis engines 106, 108, and 110, respectively. When copying the packet, in order to ensure the stability of data, the data is protected by copying the packet using the lock. In the high-speed network equipment, since the packet must be processed faster, such a lock is frequently used, and performance deteriorates due to contention between locks of analysis engines.

In the related art, analysis is sequentially performed in order to process the packets in parallel, or analysis processing is supported through packet copying.

Accordingly, there is an inefficiency of repetitively copying packets due to different processing performance, which is an ability to analyze packets in multiple processes that analyze asynchronously copied packets.

SUMMARY OF THE INVENTION

The present invention has been made in an effort to provide an apparatus and a method for distributed processing of an identical packet in high-speed network security equipment for rapidly analyzing the identical packet by multiple engines in a high-speed network security system.

Further, the present invention has been made in an effort to provide an apparatus and a method for distributed processing of an identical packet by high-speed network security equipment for improving analysis performance by reducing a packet copy time for ensuring reduction of a lock waiting time and the integrity of data by eliminating multiple packet copying and lock contention.

An exemplary embodiment of the present invention provides an apparatus for distributed processing of an identical packet in high-speed network security equipment includes:

a plurality of analysis modules for each determining whether vulnerability analysis is required by analyzing a received packet;

a circular queue for receiving the packet from an analysis module initially determining that the vulnerability analysis is required and storing the received packet as a bucket structure; and a plurality of analysis engines for each performing different vulnerability analyses for the packet acquired from the circular queue based on a packet address of the bucket structure, in which the bucket structure includes a packet data storage unit and packet use information storage units which are as many as the plurality of analysis engines, and the packet use information storage units store packet use information of the plurality of respective analysis engines, respectively.

In the apparatus for distributed processing of an identical packet in high-speed network security equipment according to an exemplary embodiment of the present invention, the analysis module determining that the vulnerability analysis of the corresponding analysis engine is required may receive the packet address of the bucket structure from the circular queue and record the packet use information of the corresponding packet use information storage unit in the bucket structure of the packet as a "use request" based on the packet address of the bucket structure.

In the apparatus for distributed processing of an identical packet in high-speed network security equipment according to an exemplary embodiment of the present invention, when the packet use information of the corresponding packet use information storage unit in the bucket structure of the corresponding packet indicates the "use request", each of the plurality of analysis engines may receive the packet address of the bucket structure from the circular queue and perform the vulnerability analysis for the packet acquired from the circular queue through the packet address, and when the vulnerability analysis is completed, change the packet use information of the corresponding packet use information storage unit in the bucket structure of the packet from the "use request" to "not used".

The apparatus for distributed processing of an identical packet in high-speed network security equipment according to an exemplary embodiment of the present invention may further include a plurality of circular queue controllers, in which each of the plurality of circular queue controllers may transfer at least one of the packet and the packet address of the bucket structure among the analysis module, the analysis engine corresponding to the analysis module, and the circular queue.

In the apparatus for distributed processing of an identical packet in high-speed network security equipment according to an exemplary embodiment of the present invention, when it is determined that the vulnerability analysis of the corresponding analysis engine is required by the analysis module, the corresponding analysis engine may record the packet use information of the corresponding packet use information storage unit in the bucket structure of the packet as "in use", perform the vulnerability analysis for the packet by using the packet acquired from the circular queue through the packet address, and change the packet use information of the corresponding packet use information storage unit of the bucket structure of the packet from the "in use" to "not used" when the vulnerability analysis is completed.

In the apparatus for distributed processing of an identical packet in high-speed network security equipment according to an exemplary embodiment of the present invention, the plurality of analysis modules may be connected in series, a first analysis module among the plurality of analysis modules may receive the packet, and after analysis of a previous analysis module is completed, each of analysis modules other than the first analysis module among the plurality of analysis modules may receive the packet from the previous analysis module.

Another exemplary embodiment of the present invention provides a method for distributed processing of an identical packet in high-speed network security equipment, the method including:

(A) transferring, by an analysis module initially determining that vulnerability analysis is required, a received packet to a circular queue;

(B) storing, by the circular queue, the received packet as a bucket structure; and (C) performing, by at least one analysis engine for performing the vulnerability analysis among a plurality of analysis engines, different vulnerability analyses for each packet acquired from the circular queue based on a packet address of the bucket structure, in which the bucket structure includes a packet data storage unit and packet use information storage units which are as many as the plurality of analysis engines, and the packet use information storage units store packet use information of the plurality of respective analysis engines, respectively.

In the method for distributed processing of an identical packet in high-speed network security equipment according to an exemplary embodiment of the present invention, the analysis module determining that the vulnerability analysis of the corresponding analysis engine is required may receive the packet address of the bucket structure from the circular queue and record the packet use information of the corresponding packet use information storage unit in the bucket structure of the packet as a "use request" based on the packet address of the bucket structure.

In the method for distributed processing of an identical packet in high-speed network security equipment according to an exemplary embodiment of the present invention, when the packet use information of the corresponding packet use information storage unit in the bucket structure of the corresponding packet indicates the "use request", each of the plurality of analysis engines may receive the packet address of the bucket structure from the circular queue and perform the vulnerability analysis for the packet acquired from the circular queue through the packet address, and when the vulnerability analysis is completed, change the packet use information of the corresponding packet use information storage unit in the bucket structure of the packet from the "use request" to "not used".

In the method for distributed processing of an identical packet in high-speed network security equipment according to an exemplary embodiment of the present invention, each of the plurality of circular queue controllers may transfer at least one of the packet and the packet address of the bucket structure among the analysis module, the analysis engine corresponding to the analysis module, and the circular queue.

In the method for distributed processing of an identical packet in high-speed network security equipment according to an exemplary embodiment of the present invention, when it is determined that the vulnerability analysis of the corresponding analysis engine is required by the analysis module, the corresponding analysis engine may record the packet use information of the corresponding packet use information storage unit in the bucket structure of the packet as "in use", perform the vulnerability analysis for the packet by using the packet acquired from the circular queue through the packet address, and change the packet use information of the corresponding packet use information storage unit of the bucket structure of the packet from the "in use" to "not used" when the vulnerability analysis is completed.

In the methods for distributed processing of an identical packet in high-speed network security equipment according to an exemplary embodiment of the present invention, the plurality of analysis modules may be connected in series, a first analysis module among the plurality of analysis modules may receive the packet, and after analysis of a previous analysis module is completed, each of analysis modules other than the first analysis module among the plurality of analysis modules may receive the packet from the previous analysis module.

According to an exemplary embodiment of the present invention, by an apparatus and a method for distributed processing of an identical packet in high-speed network security equipment, compared to an analysis system that sequentially copies and processes packets n times when the number of packet unit analysis engines is n, it is possible to reduce the copying times by (n−1) packet copying times by copying the packet only once, and as a result, it is expected to enhance the analysis processing performance of the high-speed network security equipment.

According to an exemplary embodiment of the present invention, by an apparatus and a method for distributed processing of an identical packet of high-speed network security equipment, a packet is copied once in n analysis processes having different processing capabilities, and the copied packets can be simultaneously used in n analysis processes.

According to an exemplary embodiment of the present invention, by an apparatus and a method for distributed processing of an identical packet in high-speed network security equipment, it is expected to enhance processing performance by reducing data copying in a container-based intrusion prevention system (IPS).

According to an exemplary embodiment of the present invention, by an apparatus and a method for distributed processing of an identical packet in high-speed network security equipment, performance gains can be expected by removing bottlenecks by distributing a role of a central management system used for distribution and management of the packet data.

DETAILED DESCRIPTION

The objects, specific advantages, and new features of the present invention will be more clearly understood from the following detailed description and the exemplary embodiments taken in conjunction with the accompanying drawings.

Terms or words used in the present specification and claims should not be interpreted as typical or dictionary meanings, but should be interpreted as having meanings and concepts which comply with the technical spirit of the present disclosure, based on the principle that an inventor can appropriately define the concept of the term to describe his/her own invention in the best manner.

In the present specification, when reference numerals refer to components of each drawing, it is to be noted that although the same components are illustrated in different drawings, the same components are denoted by the same reference numerals as possible.

The terms "first", "second", "one surface", "other surface", etc. are used to distinguish one component from another component and the components are not limited by the terms.

Hereinafter, in describing the present invention, a detailed description of related known art which may make the gist of the present invention unnecessarily ambiguous will be omitted.

Hereinafter, an exemplary embodiment of the present invention will be described in detail with reference to the accompanying drawings.

Figure 2:
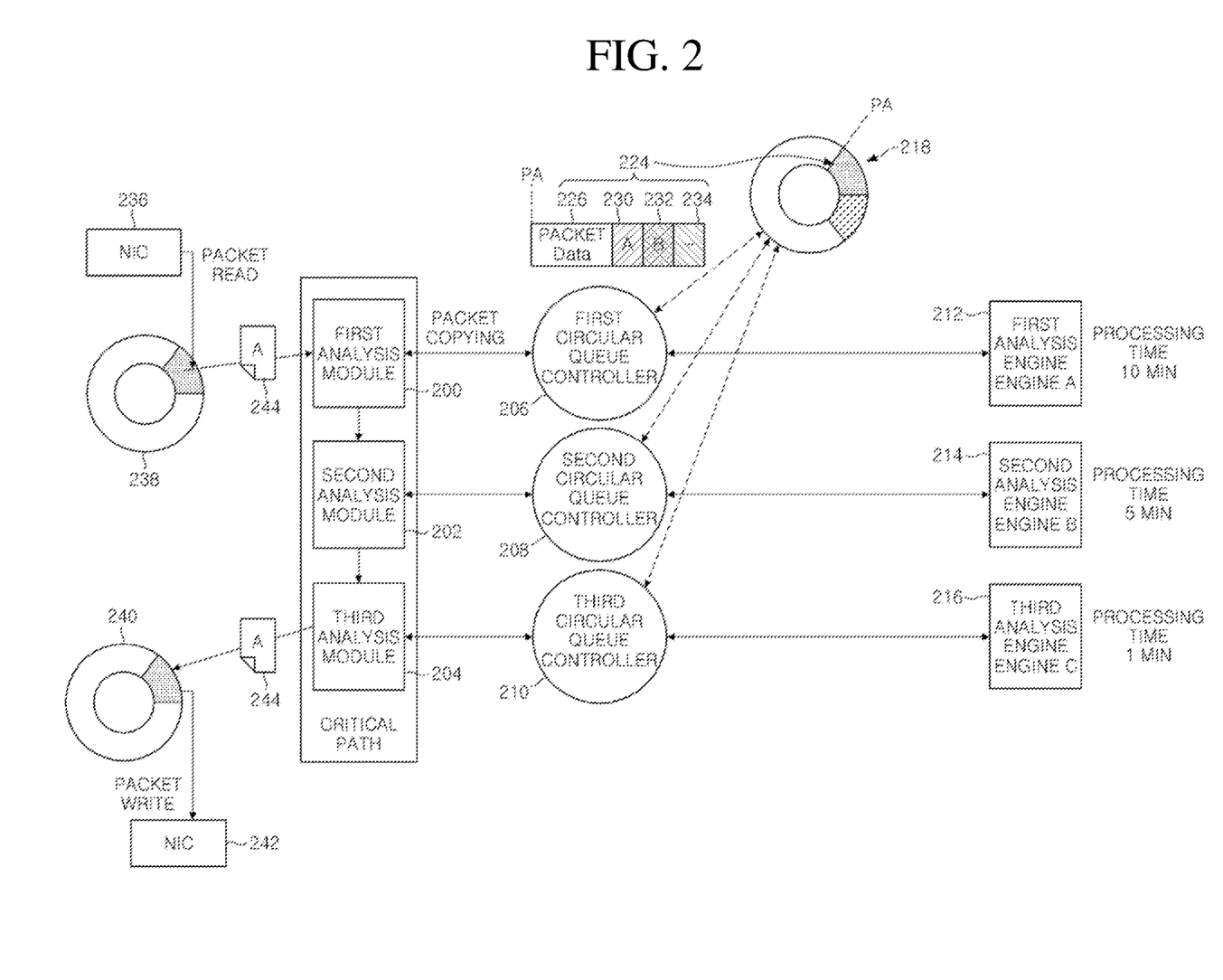
FIG. 2 is a diagram illustrating an apparatus for distributed processing of an identical packet in high-speed network security equipment according to an exemplary embodiment of the present invention.
Figure 3:
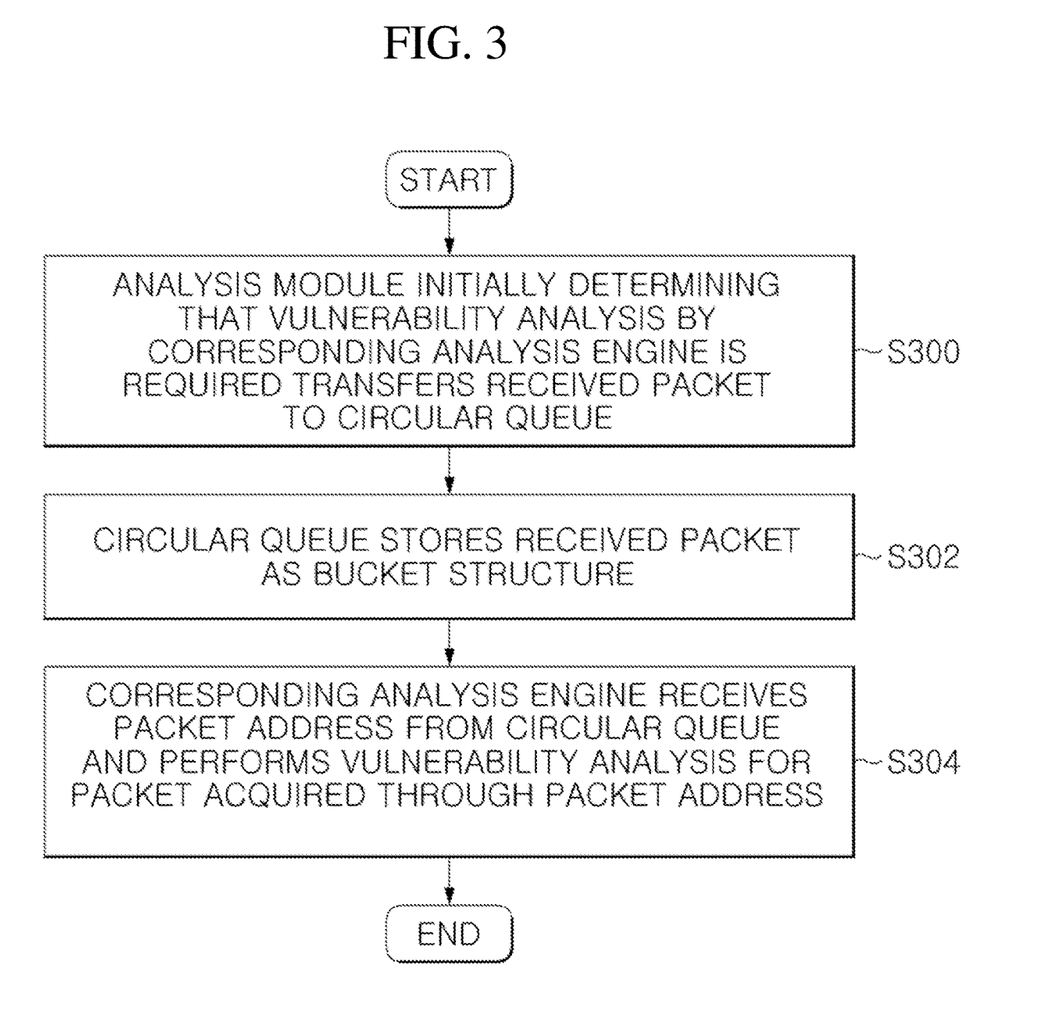
FIG. 3 is a flowchart of a method for distributed processing of an identical packet in high-speed network security equipment according to an exemplary embodiment of the present invention.

FIG. 2 is a diagram illustrating an apparatus for distributed processing of an identical packet in high-speed network security equipment according to an exemplary embodiment of the present invention and FIG. 3 is a flowchart of a method for distributed processing of an identical packet in high-speed network security equipment according to an exemplary embodiment of the present invention.

An apparatus for distributed processing of an identical packet in high-speed network security equipment according to an exemplary embodiment of the present invention illustrated in FIG. 2 includes a first analysis module 200 for determining whether vulnerability analysis is required by analyzing a packet 244 received through a network interface card 236 and a packet storage unit 238, a second analysis module 202 for determining whether the vulnerability analysis is required by analyzing the packet received from the first analysis module 200, a third analysis module 204 for determining whether the vulnerability analysis is required by analyzing the packet received from the second analysis module 202, a lockless circular queue 218 for receiving the packet from an analysis module for first determining that the vulnerability analysis is required and storing the received packet as a bucket structure 224, and first to third analysis engines 212, 214, and 216 and first to third circular queue controllers 206, 208, and 210 for performing different vulnerability analyses for packet data acquired from the packet data storage unit 226 of the bucket structure 224 of the lockless circular queue 218 based on a packet address (PA) of the bucket structure 224.

The first to third analysis modules 200, 202, and 204 located in a critical path quickly analyze packets and determine whether vulnerability analysis is required for the packets, respectively.

The bucket structure 224 includes a packet data storage unit 226 for storing the packet data of the received packet 244 and packet use information storage units 230, 232, and 234 which are as many as the first to third analysis engines 212, 214, and 216. In the exemplary embodiment, since the number of analysis engines is 3, the number of the packet use information storage units 230, 232, and 234 is also 3.

Each of the first to third circular queue controllers 206, 208, and 210 transfers data including the packet, the packet data stored in the packet data storage unit 226 of the bucket structure 224, and the packet address (PA) of the bucket structure 224 between the first to third analysis modules 200, 202, and 204 and the first to third analysis engines 212, 214, and 216 corresponding to the first to third analysis modules 200, 202, and 204 and the lockless circular queue 218, respectively.

Each of the packet use information storage units 230, 232, and 234 stores packet use information of each of the first to third analysis engines 212, 214, and 216.

In FIG. 2, reference numerals 236 and 242 denote a network interface card (NIC) and reference numerals 238 and 240 denote a packet storage unit.

An operation of the apparatus for distributed processing of an identical packet in high-speed network security equipment according to an exemplary embodiment of the present invention configured as described above will be described below with reference to FIGS. 2 and 3.

First, the first analysis module 200 receives a packet 244 through the network interface card 236 and the packet storage unit 238.

Meanwhile, it is assumed that in the apparatus for distributed processing of an identical packet in high-speed network security equipment according to an exemplary embodiment of the present invention illustrated in FIG. 2, as a result of analyzing the packet in the first analysis module 200, the vulnerability analysis by the first analysis engine 212 which is a corresponding analysis engine is required, as a result of analyzing the packet in the second analysis module 202, the vulnerability analysis by the second analysis engine 214 which is the corresponding analysis engine is required, and as a result of analyzing the packet in the third analysis module 204, the vulnerability analysis by the third analysis engine 216 which is the corresponding analysis engine is not required.

In step S300, the analysis module initially determining that the vulnerability analysis is required transfers the received packet to the lockless circular queue 218.

The first analysis module 200 analyzes the received packet 244 and determines whether the vulnerability analysis by the first analysis engine 212, which is the corresponding analysis engine, is required.

In an exemplary embodiment of the present invention, as a result of analyzing the packet 244 by the first analysis module 200, it is determined that the vulnerability analysis by the first analysis engine 212 is required and the packet 244 is transferred to the lockless circular queue 218 through a first circular queue controller 206.

In step S302, the lockless circular queue 218 stores the received packet as the bucket structure 224.

In an exemplary embodiment of the present invention, the analysis module that initially determines that the vulnerability analysis is required is the first analysis module 200.

However, when the analysis module that initially determines that the vulnerability analysis is required is the second analysis module 202 instead of the first analysis module 200, that is, as a result of analyzing the packet 244 by the first analysis module 200, it is determined that the vulnerability analysis by the first analysis engine 212 is not required, and as a result, the packet 244 is not transferred to the circular queue 218 through the first circular queue controller 206 but transferred to the second analysis module 202 and as a result of analyzing the packet received from the first analysis module 200 by the second analysis module 202, when it is determined that the vulnerability analysis by the second analysis engine 214 is required, the packet received by the second analysis module 202 is transferred to the lockless circular queue 218 through the second circular queue controller 208 and stored as the bucket structure 224.

When the analysis module that initially determines that the vulnerability analysis is required is the third analysis module 204 instead of the first analysis module 200 and the second analysis module 202, that is, as a result of analyzing the packet 244 by the first analysis module 200 and the second analysis module 202, it is determined that the vulnerability analysis by the first analysis engine 212 and the second analysis engine 214 is not required, and as a result, the packet 244 is not transferred to the first circular queue controller 206 and the second circular queue controller 208, but transferred to the third analysis module 204 and as a result of analyzing the packet received from the second analysis module 202 by the third analysis module 204, it is determined that the vulnerability analysis by the third analysis engine 216 is required, the packet received by the third analysis module 204 is transferred to the lockless circular queue 218 through the third circular queue controller 210 and stored as the bucket structure 224.

The bucket structure 224 includes a packet data storage unit 226 for storing the packet data of the received packet and packet use information storage units 230, 232, and 234 which are as many as the first to third analysis engines 212, 214, and 216. That is, in an exemplary embodiment of the present invention, since there are three analysis engines 212, 214, and 216, there are also three packet use information storage units 230, 232, and 234.

Each of the packet use information storage units 230, 232, and 234 stores packet use information of each of the first to third analysis engines 212, 214, and 216.

The first packet use information storage unit 230 is a storage space for storing packet use information of the first analysis engine 212, the second packet use information storage unit 232 is a space for storing the packet use information of the second analysis engine 214, and the third packet use information storage unit 234 is a storage space for storing the packet use information of the third analysis engine 216.

The bucket structure 224 is stored in the circular queue 218 with the packet address PA as a starting address.

Next, the lockless circular queue 218 storing the packet as the bucket structure 224 transfers the packet address PA of the bucket structure 224 to the first analysis module 200 through the first circular queue controller 206 and the first analysis module 200 that determines that the vulnerability analysis by the first analysis engine 212 is required records, as a "use request (A)", the packet use information of the corresponding packet use information storage unit 230 in the bucket structure 224 based on the packet address PA of the bucket structure 224 received from the lockless circular queue 218.

In step S304, the analysis engine in which the vulnerability analysis is performed among the first to third analysis engines 212, 214, and 216 performs different vulnerability analyses for the packet data stored in the packet data storage unit 226 of the lockless circular queue 218, respectively based on the packet address PA of the bucket structure 224.

In an exemplary embodiment of the present invention, since it is assumed that the vulnerability analysis by the first and second analysis engines 212 and 214 needs to be performed, the vulnerability analysis by the first analysis engine 212 and the second analysis engine 214 is performed. This is sequentially described as follows.

Each of the first to third analysis engines 212, 214, and 216 periodically checks the packet use information of each of the corresponding packet use information storage units 230, 232, and 234 in the bucket structure 224. That is, the first analysis engine 212 periodically checks the packet use information of the corresponding packet use information storage unit 230 in the bucket structure 224, the second analysis engine 214 periodically checks the packet use information of the corresponding packet use information storage unit 232 in the bucket structure 224, and the third analysis engine 216 periodically checks the packet use information of the corresponding packet use information storage unit 234 in the bucket structure 224.

First, the first analysis engine 212 periodically checks the corresponding packet use information storage unit 230 in the bucket structure 224.

In an exemplary embodiment of the present invention, since the packet use information of the corresponding packet use information storage unit 230 in the bucket structure 224 indicates the "use request (A)", the first analysis engine 212 receives the packet address (PA) of the bucket structure 224 from the lockless circular queue 218 through the first circular queue controller 206 and performs the vulnerability analysis for the packet data acquired from the packet data storage unit 226 of the bucket structure 224 of the lockless circular queue 218 through the packet address PA, and when the vulnerability analysis is completed, changes the packet use information of the corresponding packet use information storage unit 230 in the bucket structure 224 of the corresponding packet from the "use request (A)" to "not used (-)".

In the drawing, for convenience of explanation, when indicating the packet use information of the packet use information storage units 230, 232, and 234, the "use request" is represented by A, B, or C, and the "not used" is represented by "-", but the "use request" may be expressed "1" and the "not used" may be expressed as "0".

Meanwhile, when the lockless circular queue 218 storing the packet as the bucket structure 224 transfers the packet address PA of the bucket structure 224 to the first analysis module 200 through the first circular queue controller 206 to notify that the packet is stored in the lockless circular queue 218 to the first analysis module 200, the first analysis module 200 transfers the packet to the second analysis module 202.

The second analysis module 202 analyzes the packet received from the first analysis module 200 and determines whether the vulnerability analysis by the second analysis engine 214, which is the corresponding analysis engine, is required.

In an exemplary embodiment of the present invention, as a result of analyzing the packet by the second analysis module 202, when it is determined that the vulnerability analysis by the second analysis engine 214 is required, the second analysis module 202 acquires the packet address PA of the bucket structure 224 through the second circular queue controller 208.

In an exemplary embodiment of the present invention, the second analysis module 202 determines that the vulnerability analysis by the second analysis engine 214 is required, and the second analysis module 202 that determines that the vulnerability analysis by the second analysis engine 214 is required records, as the "use request (B)", the packet use information of the corresponding packet use information storage unit 232 in the bucket structure 224 based on the packet address PA of the bucket structure 224 acquired from the lockless circular queue 218 through the second circular queue controller 208.

The second analysis engine 214 periodically checks the corresponding packet use information storage unit 232 in the bucket structure 224.

In an exemplary embodiment of the present invention, since the packet use information of the corresponding packet use information storage unit 232 in the bucket structure 224 indicates the "use request (B)", the second analysis engine 214 receives the packet address (PA) of the bucket structure 224 from the lockless circular queue 218 through the second circular queue controller 208 and performs the vulnerability analysis for the packet data acquired from the packet data storage unit 226 of the bucket structure 224 of the lockless circular queue 218 through the packet address PA, and when the vulnerability analysis is completed, changes the packet use information of the corresponding packet use information storage unit 232 in the bucket structure 224 of the corresponding packet from the "use request (B)" to the "not used (-)".

In an exemplary embodiment of the present invention, only the vulnerability analysis by the first and second analysis engines 212 and 214 needs to be performed, and as a result of analyzing the packet received from the second analysis module 202 by the third analysis module 204, it is determined that the vulnerability analysis by the third analysis engine 216 does not need to be performed, and as a result, the vulnerability analysis by the third analysis engine 216 for the packet received by the third analysis module 204 is not performed.

As described above, according to the apparatus and the method for distributed processing of an identical packet in high-speed network security equipment according to an exemplary embodiment of the present invention, when the number of packet unit analysis engines is n, it is not necessary to copy the packet n times and the packet is copied only once and only a packet address (a pointer of the packet in the circular queue) of the copied packet may be transferred to the corresponding analysis engine.

Since packets copied from n analysis processes may be simultaneously used by copying a packet once in n analysis processes having different processing performance, it is possible to enhance the processing performance by reducing packet copying.

In an exemplary embodiment of the present invention, since the third analysis engine 216 having a processing time of 1 minute may perform the vulnerability analysis by using the packet data shared and stored in the packet data storage unit 226 of the bucket structure 224 of the circular queue 218, even while the first analysis engine 212 having a processing time of 10 minutes and the second analysis engine 214 having a processing time of 5 minutes perform the vulnerability analysis for the packet, that is, even when the first analysis engine 212 and the second analysis engine 214 do not complete the vulnerability analysis for the packet, the third analysis engine 216 completes performing the vulnerability analysis earlier than the first analysis engine 212 and the second analysis engine 214 to perform the vulnerability analysis for a new packet transmitted next to the packet, and thus perform the vulnerability analysis for the packet more quickly.

By checking the packet use information of the packet use information storage units 230, 232, and 234 corresponding to each analysis engine in the bucket structure 224 of the packet, it is possible to check whether the analysis engines use the packet, and as a result, use completion processing for a packet of which using is completed for each analysis engine is possible and when using all packets (bucket structures) is completed, the packet may be quickly input into a central management storage unit.

Figure 4:
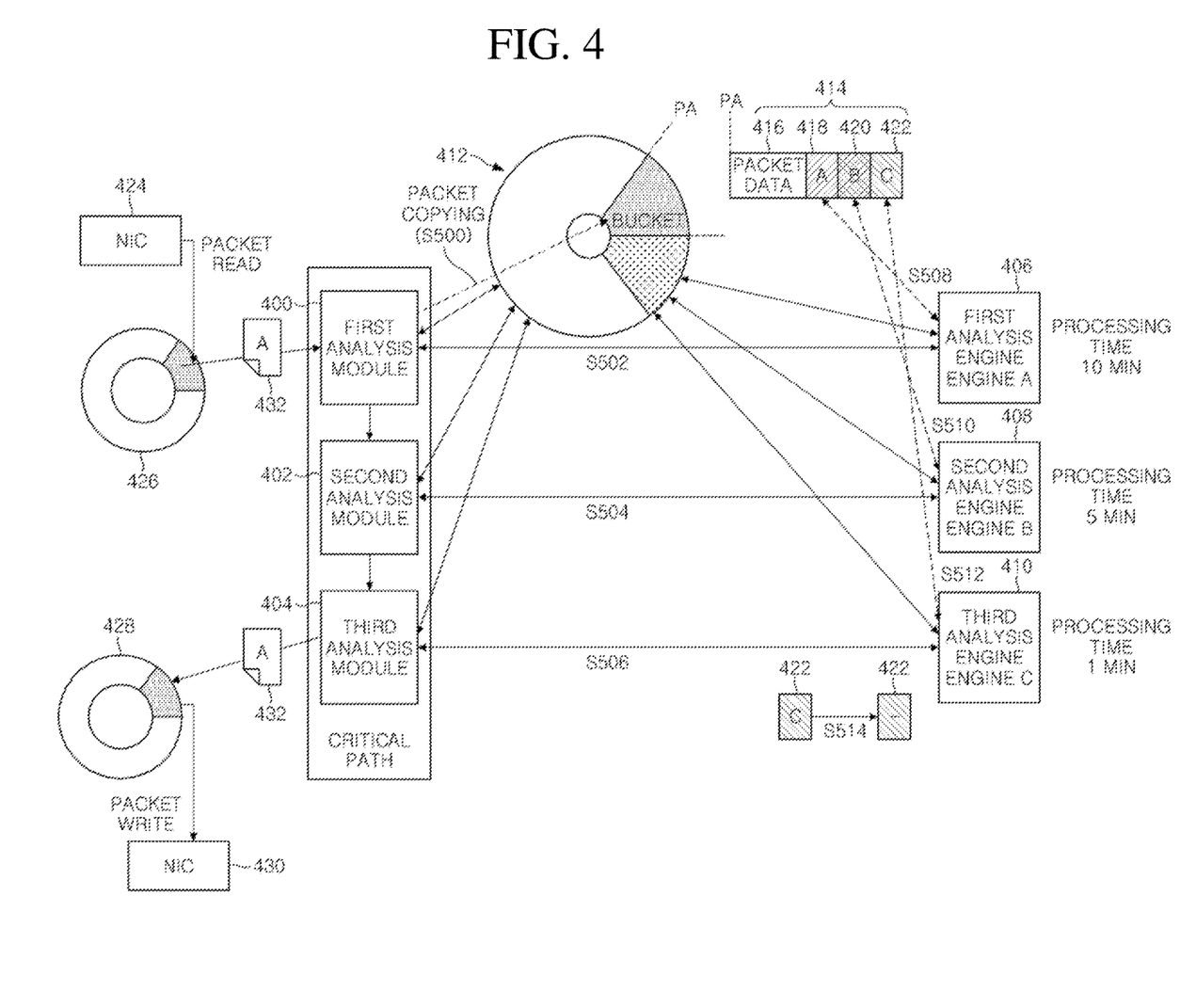
FIG. 4 is a diagram illustrating an apparatus for distributed processing of an identical packet in high-speed network security equipment according to another exemplary embodiment of the present invention.

FIG. 4 is a diagram illustrating an apparatus for distributed processing of an identical packet in high-speed network security equipment according to another exemplary embodiment of the present invention.

An apparatus for distributed processing of an identical packet in high-speed network security equipment according to another exemplary embodiment of the present invention illustrated in FIG. 4 includes a first analysis module 400 for determining whether vulnerability analysis is required by analyzing a packet 432 received through a network interface card 424 and a packet storage unit 426, a second analysis module 402 for determining whether the vulnerability analysis is required by analyzing the packet received from the first analysis module 400, a third analysis module 404 for determining whether the vulnerability analysis is required by analyzing the packet received from the second analysis module 402, a lockless circular queue 412 for receiving the packet from an analysis module for first determining that the vulnerability analysis is required and storing the received packet as a bucket structure 414, and first to third analysis engines 406, 408, and 410 for performing different vulnerability analyses for packet data acquired from the packet data storage unit 416 of the bucket structure 414 of the lockless circular queue 412 based on a packet address (PA) of the bucket structure 414.

The first to third analysis modules 400, 402, and 404 located in a critical path quickly analyze packets and determine whether vulnerability analysis is required for the packets, respectively.

The bucket structure 414 includes a packet data storage unit 416 for storing the packet and packet use information storage units 418, 420, and 422 which are as many as the first to third analysis engines 406, 408, and 410. In the exemplary embodiment, since the number of analysis engines is 3, the number of the packet use information storage units 418, 420, and 422 is also 3.

Each of the packet use information storage units 418, 420, and 422 stores packet use information of each of the first to third analysis engines 406, 408, and 410.

In FIG. 4, reference numerals 424 and 430 denote a network interface card (NIC) and reference numerals 426 and 428 denote a packet storage unit.

The operation of the apparatus for distributed processing of an identical packet in high-speed network security equipment according to another exemplary embodiment of the present invention configured as such will be described below.

First, the first analysis module 400 receives a packet 432 through the network interface card 424 and the packet storage unit 426.

Meanwhile, it is assumed that in the apparatus for distributed processing of an identical packet in high-speed network security equipment according to another exemplary embodiment of the present invention illustrated in FIG. 4, as a result of analyzing a packet 432 in the first to third analysis modules 400, 402, and 404, it is determined that the vulnerability analysis by the first to third analysis engines 406, 408, and 410 which are respective corresponding analysis engines is required.

The analysis module initially determining that the vulnerability analysis is required transfers the received packet to the lockless circular queue 412.

The first analysis module 400 analyzes the received packet 432 and determines whether the vulnerability analysis by the first analysis engine 406, which is the corresponding analysis engine, is required.

In an exemplary embodiment of the present invention, as a result of analyzing the packet 432 by the first analysis module 400, it is determined that the vulnerability analysis by the first analysis engine 406 is required and the packet 432 is transferred to the lockless circular queue 412 (S500).

The lockless circular queue 412 stores the received packet as the bucket structure 414.

In an exemplary embodiment of the present invention, the analysis module that initially determines that the vulnerability analysis is required is the first analysis module 400.

However, when the analysis module initially determining that the vulnerability analysis is required is the second analysis module 402 instead of the first analysis module 400, that is, as a result of analyzing the packet 432 by the first analysis module 400, it is determined that the vulnerability analysis by the first analysis engine 406 is not required, and as a result, the packet 432 is not transferred to the lockless circular queue 412 but transferred to the second analysis module 402 and as a result of analyzing the packet received from the first analysis module 400 by the second analysis module 402, when it is determined that the vulnerability analysis by the second analysis engine 408 is required, the packet received by the second analysis module 402 is transferred to the lockless circular queue 412 and stored in the packet data storage unit 416 of the bucket structure 414 as the packet data.

The bucket structure 414 includes a packet data storage unit 416 for storing the packet as the packet data and packet use information storage units 418, 420, and 422 which are as many as the first to third analysis engines 406, 408, and 410. That is, in another exemplary embodiment of the present invention, since there are three analysis engines 406, 408, and 410, there are also three packet use information storage units 418, 420, and 422.

Each of the packet use information storage units 418, 420, and 422 stores packet use information of each of the first to third analysis engines 406, 408, and 410.

The first packet use information storage unit 418 is a storage space for storing packet use information of the first analysis engine 406, the second packet use information storage unit 420 is a space for storing the packet use information of the second analysis engine 408, and the third packet use information storage unit 422 is a storage space for storing the packet use information of the third analysis engine 410.

The bucket structure 414 is stored in the circular queue 412 with the packet address PA as a starting address.

When it is determined that the vulnerability analysis of the corresponding analysis engines 406, 408, and 410 is required by the first to third analysis modules 400, 402, and 404, that is, when the first to third analysis engines 406, 408, and 410 perform the vulnerability analysis by using the packet, only the packet address (PA) of the bucket structure 414 stored in the lockless circular queue 412 is transferred to each of the first to third analysis engines 406, 408, and 410 (S502, S504, and S506).

The packet address PA of the bucket structure 414 stored in the lockless circular queue 412 is transferred to each of the corresponding first to third analysis engines 406, 408, and 410 by the first to third analysis modules 400, 402, and 404 (S502, S504, and S506). However, the present invention is not limited thereto, and the packet address PA of the bucket structure 414 stored in the lockless circular queue 412 may be transmitted to each of the first to third analysis engines 406, 408, and 410 by the lockless circular queue 412.

The first to third analysis engines 406, 408, 410 record that the packet use information of the corresponding packet use information storage units 418, 420, and 422 in the bucket structure 414 of the corresponding packet as "in use (A, B or C)" (S508, S510, and S512), and perform the vulnerability analysis for the packet data by using the packet data acquired from the packet data storage unit 416 of the bucket structure 414 of the lockless circular queue 412 through the packet address PA and when the vulnerability analysis is completed, changes the packet use information of the corresponding packet use information storage unit 418, 420, and 422 of the bucket structure 414 of the packet from the "in use (A, B, or C)" to the "not used (-)".

As illustrated in FIG. 4, it is assumed that packet processing speeds of the respective analysis engines 406, 408, and 410 are different. For example, it is assumed that a packet processing time of a first analysis engine 406 is 10 minutes, the packet processing time of a second analysis engine 408 is 5 minutes, and the packet processing time of a third analysis engine 410 is 1 minute.

When the analysis processing speeds of the respective analysis engines are different, if each packet is not copied in the existing case, until processing of one analysis engine is completed by the lock, another analysis engine should wait and should wait for a maximum time of each analysis engine. Alternatively, each packet should be copied and processed in order to maximally reduce the interference.

As illustrated in FIG. 4, when the packet processing time of the first analysis engine 406 is 10 minutes, the packet processing time of the second analysis engine 408 is 5 minutes, and the packet processing time of the third analysis engine 410 is 1 minute, the third analysis engine 410 processes faster packet processing more efficiently and updates only whether the packet is used so that there is no interference. That is, the third analysis engine 410 changes the packet use information of the corresponding third packet use information storage unit 422 of the bucket structure 414 from "in use (C)" to "not used (-)" (S514) and requests a next packet.

When all analysis engines 406, 408, and 410 do not use the packet, information may be updated to another packet by returning the bucket structure 414.

While the present invention has been particularly described with reference to detailed exemplary embodiments thereof, it is to specifically describe the present invention and the present invention is not limited thereto and it will be apparent that modification and improvement of the present invention can be made by those skilled in the art within the technical spirit of the present invention.

Simple modification and change of the present invention all belong to the scope of the present invention and a detailed protection scope of the present invention will be clear by the appended claims.

What is claimed is:

1. An apparatus for distributed processing of an identical packet in high-speed network security equipment, the apparatus comprising:
a plurality of analysis modules for each determining whether vulnerability analysis is required by analyzing a received packet;
a circular queue for receiving the packet from an analysis module initially determining that the vulnerability analysis is required and storing the received packet as a bucket structure; and
a plurality of analysis engines for each performing different vulnerability analyses for the packet acquired from the circular queue based on a packet address of the bucket structure,
wherein the bucket structure includes a packet data storage unit and packet use information storage units which are as many as the plurality of analysis engines, and
the packet use information storage units store packet use information of the plurality of respective analysis engines, respectively,
wherein the analysis module determining that the vulnerability analysis by the corresponding analysis engine records the packet use information of the corresponding packet use information storage unit in the bucket structure of the packet as a "use request",
wherein when the packet use information of the corresponding packet use information storage unit in the bucket structure of the corresponding packet indicates the "use request", each of the plurality of analysis engines performs the vulnerability analysis for the packet acquired from the circular queue, and when the vulnerability analysis is completed, changes the packet use information of the corresponding packet use information storage unit in the bucket structure of the packet from "use request" to "not used".

2. The apparatus of claim 1, further comprising:
a plurality of circular queue controllers,
wherein each of the plurality of circular queue controllers transfers at least one of the packet and the packet address of the bucket structure among the analysis module, the analysis engine corresponding to the analysis module, and the circular queue.

3. The apparatus of claim 1, wherein when it is determined that the vulnerability analysis of the corresponding analysis engine is required by the analysis module, the corresponding analysis engine records the packet use information of the corresponding packet use information storage unit in the bucket structure of the packet as "in use", performs the vulnerability analysis for the packet by using the packet acquired from the circular queue through the packet address, and changes the packet use information of the corresponding packet use information storage unit of the bucket structure of the packet from the "in use" to "not used" when the vulnerability analysis is completed.

4. The apparatus of claim 1, wherein the plurality of analysis modules are connected in series,
a first analysis module among the plurality of analysis modules receives the packet, and
after analysis of a previous analysis module is completed, each of analysis modules other than the first analysis module among the plurality of analysis modules receives the packet from the previous analysis module.

5. A method for distributed processing of an identical packet in high-speed network security equipment, the method comprising:
(A) transferring, by an analysis module initially determining that vulnerability analysis is required, a received packet to a circular queue;
(B) storing, by the circular queue, the received packet as a bucket structure; and
(C) performing, by at least one analysis engine for performing the vulnerability analysis among a plurality of analysis engines, different vulnerability analyses for each packet acquired from the circular queue based on a packet address of the bucket structure,
wherein the bucket structure includes a packet data storage unit and packet use information storage units which are as many as the plurality of analysis engines, and
the packet use information storage units store packet use information of the plurality of respective analysis engines, respectively,
wherein the analysis module determining that the vulnerability analysis by the corresponding analysis engine records the packet use information of the corresponding packet use information storage unit in the bucket structure of the packet as a "use request",
wherein when the packet use information of the corresponding packet use information storage unit in the bucket structure of the corresponding packet indicates the "use request", each of the plurality of analysis engines performs the vulnerability analysis for the packet acquired from the circular queue, and when the vulnerability analysis is completed, changes the packet use information of the corresponding packet use information storage unit in the bucket structure of the packet from "use request" to "not used".

6. The method of claim 5, wherein each of the plurality of circular queue controllers transfers at least one of the packet and the packet address of the bucket structure among the analysis module, the analysis engine corresponding to the analysis module, and the circular queue.

7. The method of claim 5, wherein when it is determined that the vulnerability analysis of the corresponding analysis engine is required by the analysis module, the corresponding analysis engine records the packet use information of the corresponding packet use information storage unit in the bucket structure of the packet as "in use", performs the vulnerability analysis for the packet by using the packet acquired from the circular queue through the packet address, and changes the packet use information of the corresponding packet use information storage unit of the bucket structure of the packet from the "in use" to "not used" when the vulnerability analysis is completed.

8. The method of claim 5, wherein the plurality of analysis modules are connected in series,
a first analysis module among the plurality of analysis modules receives the packet, and
after analysis of a previous analysis module is completed, each of analysis modules other than the first analysis module among the plurality of analysis modules receives the packet from the previous analysis module.

* * * * *